United States Patent [19]

Lund et al.

[11] Patent Number: 4,907,920

[45] Date of Patent: Mar. 13, 1990

[54] MILLING CUTTER FOR HONEYCOMB CORE MATERIAL

[75] Inventors: Wesley C. Lund; Dan E. Pedersen, both of Seattle, Wash.

[73] Assignee: The Boeing Company, Seattle, Wash.

[21] Appl. No.: 298,162

[22] Filed: Jan. 18, 1989

[51] Int. Cl.$^4$ .............................................. B23P 15/28
[52] U.S. Cl. ...................................... 409/132; 83/666; 83/853; 407/2; 407/55; 407/59; 407/61
[58] Field of Search ............................... 407/42, 53–55, 407/58, 59, 61, 1, 2; 83/666, 838, 849, 853, 854; 144/218, 219, 222; 409/131, 132

[56] References Cited

U.S. PATENT DOCUMENTS

| | | | |
|---|---|---|---|
| 714,359 | 11/1902 | Brooks. | |
| 1,328,430 | 1/1920 | Hathaway. | |
| 2,894,583 | 7/1959 | Johnstad | 83/676 X |
| 2,929,299 | 3/1960 | Jenkins | 409/182 |
| 3,574,911 | 4/1971 | Penoyar | 29/9 S |
| 4,068,976 | 1/1978 | Friedline | 407/114 |
| 4,199,284 | 4/1980 | Kress et al. | 408/233 |
| 4,248,553 | 2/1981 | Kraemer | 407/114 |
| 4,551,918 | 11/1985 | Smithberg | 407/51 X |
| 4,620,821 | 11/1986 | Roth | 407/1 |
| 4,655,648 | 4/1987 | Hellbergh | 407/42 |
| 4,677,886 | 7/1987 | Neu | 83/663 X |
| 4,794,836 | 1/1989 | Villani | 407/53 X |

FOREIGN PATENT DOCUMENTS 162936 5/1921 United Kingdom.

Primary Examiner—Steven C. Bishop
Attorney, Agent, or Firm—Seed and Berry

[57] ABSTRACT

A milling cutter tool for cleanly and smoothly cutting honeycomb core material is disclosed. The cutter tool includes a circular saw blade sharpened to a knife edge. A bevel extends from the upper surface towards the sharp peripheral edge. A plurality of cutter bodies extend vertically above the circular saw blade. The cutter bodies include a plurality of teeth generally parallel to each other and extending vertically with respect to each other. The teeth include a piercing point and sharp cutting edges extending at a clearance angle from the piercing point. A flat surface extends between the teeth. The circular saw blade having a sharp bevel cutting edge provides a clean cut of the honeycomb core material at the surface to be cut. The sharp points of the cutting edges pierce the honeycomb material, dig into it and slice it. The cutting edges further slice and cut the dross honeycomb core material as it is separated from the surface being cut. A clean, smooth surface is left to which a panel may be bonded.

16 Claims, 4 Drawing Sheets

MILLING CUTTER FOR HONEYCOMB CORE MATERIAL

DESCRIPTION

1. Technical Field

This invention relates to milling cutters for honeycomb core material, and more particularly, to a cutter assembly for machining honeycomb core surfaces to a close tolerance in simple and compound contours.

2. Background of the Invention

Honeycomb core material is currently used extensively in aircraft structures because of its high strength and light weight. Frequently, the honeycomb core material must be cut and machined to a particular contour. The contours may be simple or compound contours, such as those found on airplane wing structures, rudders or other aircraft surfaces. After the core material is cut, a layer of material is bonded to the newly cut surface to form the outer surface of the aircraft structure. The edges and surfaces of the honeycomb core must be cleanly and evenly cut without being ragged, or burred or having fuzz. If the cut surface contains burrs or fuzz, sheets of material subsequently bonded to the cut surface will not properly adhere. Forming a strong, reliable bond requires a clean, fuzz-free surface.

Honeycomb core material may be made from a variety of structures. The honeycomb core may be paper, plastic, composite material or metal. Materials recently used in advanced aircraft may include honeycomb core material made from plastics, glass fibers, graphite/epoxy composites or other material. Milling cutters designed for use on a particular honeycomb core material, such as metal, may be ineffective for cleanly cutting a second type of material, such as paper, graphite/epoxy composites or other material.

Prior to this invention, machining, followed by hand sanding was required to provide a clean, final surface having the desired contoured shape. Diamond grit-coated cutters were used for rough cutting, but because they leave a very heavy fuzz, subsequent sanding and hand operations were required to smooth the surface. Conventional end mill cutting tools do not work on the low-density core paper because the dross above the cut edge moves away from the cutter rather than being cut clean. The result is a finish with a heavy fuzz which must also be sanded and removed by hand. Sanding by hand creates the possibility that the machine cut contour will be changed or destroyed by over sanding. The prior art approaches are labor-intensive and rely upon worker skill to produce dimensionally accurate parts. The prior art milling cutters are only capable of machining a simple contour and cannot machine a contour in low-density honeycomb material. Various cutters have been tried to accomplish the contoured cutting of the surfaces, but all previous cutters have provided either a very shallow cut or have failed to remove the swarf properly and have left a rough surface with burrs or fuzz.

SUMMARY OF THE INVENTION

It is therefore an object of this invention to provide a milling cutter which leaves a clean, burr-free surface.

It is a further object of this invention to provide a method of cutting honeycomb core material in a desired contour which leaves the surface sufficiently clean that thin, compliant sheets may be bonded to the cut surface with a strong, reliable bond.

It is another object of this invention to machine cut a complex contour in honeycomb core material.

It is another object of this invention to provide a method of cutting the honeycomb core by contacting the surface at a single point while simultaneously slicing the dross above the cut surface just as it is cut.

These and other objects of the invention are accomplished by providing a circular saw blade coupled to a shaft and a plurality of circumferentially spaced cutter bodies mounted on the shaft adjacent the circular saw blade. A sharp, beveled cutting edge is located around a peripheral edge of the circular saw blade. The cutter bodies include a plurality of teeth having sharpened piercing points. The teeth of the cutter body include sharp cutting edges that extend at a clearance angle away from the piercing points for cleanly cutting up and disposing of the swarf. The cutter body cutting teeth extend from the cutter body at a 60° angle to form the sharp cutting edge and the piercing point. Three cutter bodies are positioned axially equidistant from each other on the circular cutting saw blade. The individual teeth of each cutter body extend vertically with respect to each other above the sharpened, beveled cutting edge of the circular saw blade. The teeth of each of the three cutter bodies are offset with respect to each other to cleanly slice up the dross. The milling tool of this invention provides a deeper and cleaner cut of honeycomb core material than has previously been possible in the prior art.

DETAILED DESCRIPTION OF THE INVENTION

As illustrated in FIGS. 1-4, the milling cutter tool 10 includes a shank 12, cutter bodies 14, 16 and 18, and a circular saw blade 20. The shank 12 is of a conventional size for placement in the chuck of a milling or router drive motor as presently used in machines for producing complex contoured surfaces of an aircraft flight structure, such as a 5-axis router.

Figure 5:
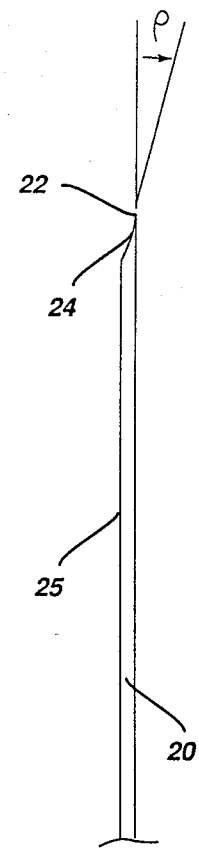
FIG. 5 is a side elevational view of the circular saw blade.

The circular saw blade 20 includes a sharpened peripheral edge 22 for cleanly cutting the honeycomb core material at the surface being cut. A bevel 24 extends from a top surface 25 towards the peripheral edge 22, as best shown in FIG. 5. The circular saw blade is ground to a knife edge to provide the sharp peripheral cutting surface 22. The desired bevel 24 is provided in the circular saw blade when it is ground to the sharp, knife edge. Providing the bevel 24 extending from the top surface 25 towards the peripheral edge has been found to provide a clean cut of the core cell edge. The top surface 40 of the edge cut is a final top surface sufficiently clean for final assembly in the aircraft structure.

The saw blade periphery includes a plurality of teeth 26 or a serrated edge. The teeth are sharp, with sharp points extending at uniform positions around the peripheral edge of the saw blade, as best illustrated in FIGS. 4–8, and 10. The tooth has a clearance $\beta$ extending from the leading point 50. A conventional slitting jeweler's saw can be ground and modified to provide the circular saw blade 20 of the invention. A "Thurston #19" jeweler's saw blade, having a thickness of 0.020 inch and an outside diameter of 1.5 inches has been demonstrated, after being properly machined and ground, to be an adequate saw blade for circular saw blade 20. A somewhat thicker saw blade may also be used, if desired, to decrease the risk of breakage. The conventional jeweler's saw blade is modified by grinding the periphery to a sharp knife edge and adding the desired bevel. The preferred bevel angle $\rho$ is approximately 15°, though other angles may also be used. In an alternative embodiment, the saw blade 20 does not have a plurality of teeth 26 and the sharp knife-cutting edge is provided around the periphery 22 with no teeth 26. The circular saw blade 20 is field to the shank 12 by a socket head screw 30 threaded into the shank 12 through the hole 28 of the circular saw blade 20. When the circular saw blade becomes dull, the old one is discarded and a new one is installed.

Figure 1:
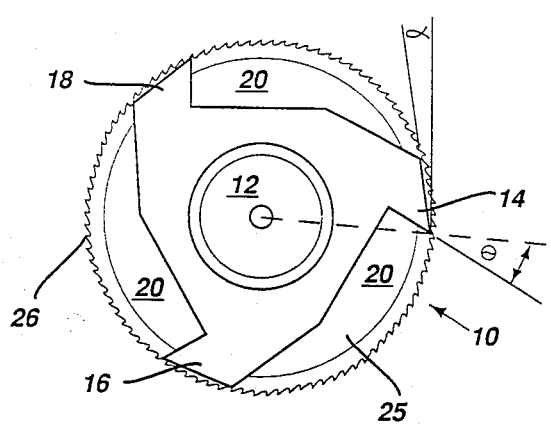
FIG. 1 is a top plan view of the milling tool of the invention.
Figure 4:
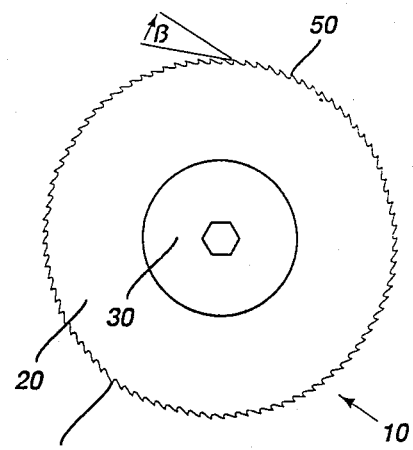
FIG. 4 is a bottom plan view of the milling tool of FIG. 1.
Figure 2:
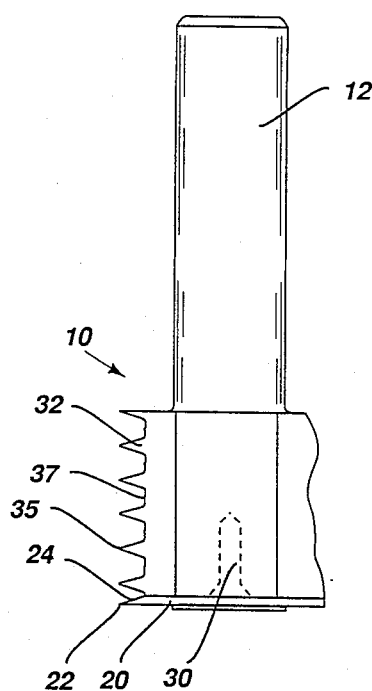
FIG. 2 is a side elevational view of the milling tool of FIG. 1.
Figure 3:
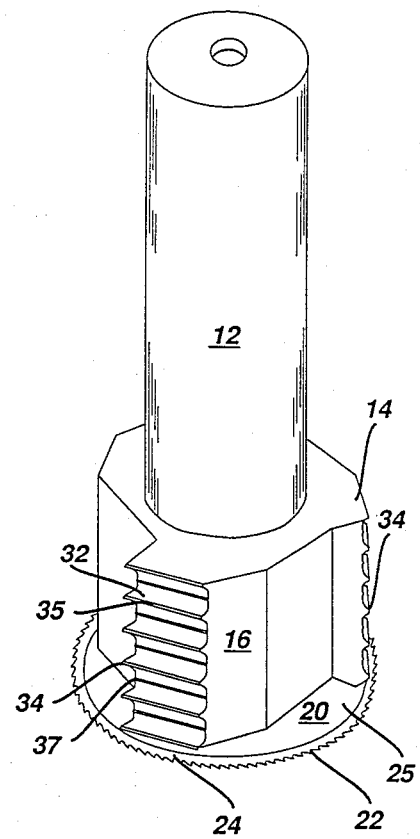
FIG. 3 is a perspective of an alternative embodiment view of the milling tool of the invention.

The cutter bodies include teeth 32 which extend vertically with respect to each other above the circular saw blade 20, as best shown in FIGS. 2 and 3. Each tooth 32 includes a piercing point 34 and a cutting edge 35. The piercing point 34 is aligned approximately radially with and above the peripheral edge 22 of the circular saw blade 20. The point 34 does not extend radially outward beyond the edge 22 to ensure that the circular saw blade is performing the cutting. The points 34 and cutting edges 35 may be a few hundredths of an inch radially inward from the edge 22. The cutting edges 32 of the cutter body are formed at an angle $\sigma$ extending from the cutter body. The angle $\sigma$ is preferably 60°, though other angles may also be used. The cutting edges extend at a clearance angle $\alpha$ with respect to the piercing point 34, as best shown in FIG. 1. The clearance angle $\alpha$ is in the range of 5°–20° and preferably in the range of 15°–17°. A surface 37 extends between the teeth 32. In one embodiment, the surface 37 is a flat, vertical surface, as shown in FIG. 1. In an alternative embodiment, the surface 37 is curved.

The cutter bodies are mounted on top of and in contact with the top surface 25 of the circular saw blade 20. The cutter bodies 14, 16 and 18 are made of a high-quality cutting material, such as high-speed steel or tungsten carbide. The cutting edges 35 are brazed carbide inserts. The individual cutter bodies 14, 16 and 18 are secured to the shank 12 by any known method, such as by being brazed, attached with screws, or the like.

The three cutter bodies 14, 16 and 18 are spaced equidistant from each other around the shank 12 and above the saw blade 20. The cutter bodies extend towards the peripheral at an angle $\theta$ with respect to a radius, as best shown in FIG. 1. The angle $\theta$ in the preferred embodiment is in the range of 5°–20° and preferably is approximately 16°. The teeth 32 extend for a distance above the circular saw blade 20 sufficiently high to cleanly cut the dross and dispose of the swarf well above the saw blade. Generally, the cutter bodies will include approximately 6 teeth per inch and extend for a height of 1 or 2 inches above the circular cutting saw blade 20. Taller cutter bodies may be required for a deeper cut into honeycomb core material.

Figure 7:
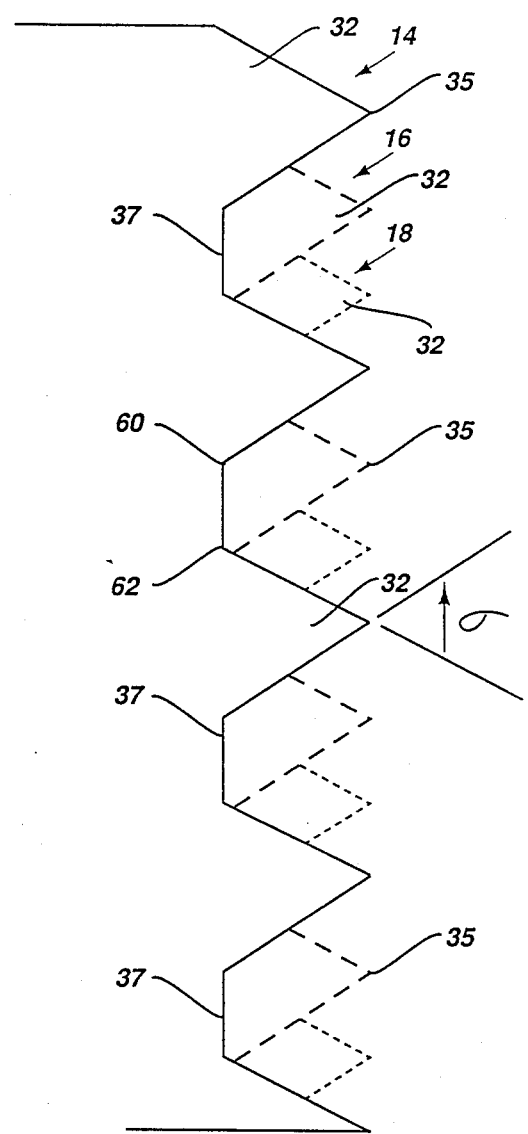
FIG. 7 is an enlarged view of the cutting edges of a cutter body with the cutting edges of the other two cutter bodies being shown in phantom lines to illustrate the cutting edges of each cutter body being offset from each other.

The teeth 32 of the respective cutter bodies 14, 16 and 18 are offset with respect to each other, as best shown in FIG. 7. The location of the teeth 32 of the cutter bodies 16 and 18 are shown in phantom with respect to each other and to the teeth 32 of the cutter body 14. The teeth are staggered $\frac{1}{3}$ of the distance between each other for insuring that the honeycomb core material is uniformly pierced and cut above the cutting saw blade 20.

The teeth 32 of the cutter bodies 16 and 18 are aligned approximately within the surface 37 between teeth 32 of the cutter body 14. The piercing point 34 and trailing sharp edge 35 of the teeth of the cutter body 16 are aligned approximately at the lower base 60 of the teeth of the cutter body 14, at the upper junction between the tooth 32 and the surface 37, as best shown in FIG. 7. The piercing point 34 and trailing sharp edge 35 of the teeth of the cutter body 18 are aligned approximately with the upper base 62 of the teeth of cutter body 14, at the lower junction between the tooth 32 and the surface 37.

In an alternative embodiment, the space 37 between the teeth 32 is rounded and curved rather than being flat and vertical. Further, the space 37 may be small or not present between the teeth, one tooth starting where the other ends, as illustrated in the cutter bodies of U.S. Pat. No. 4,551,918 to Smithberg, incorporated herein by reference. The cutter bodies of Smithberg could be placed vertically and fixed on top of the saw blade 20 of the present invention for use in the cutter tool 10 of this invention if desired.

Figure 6:
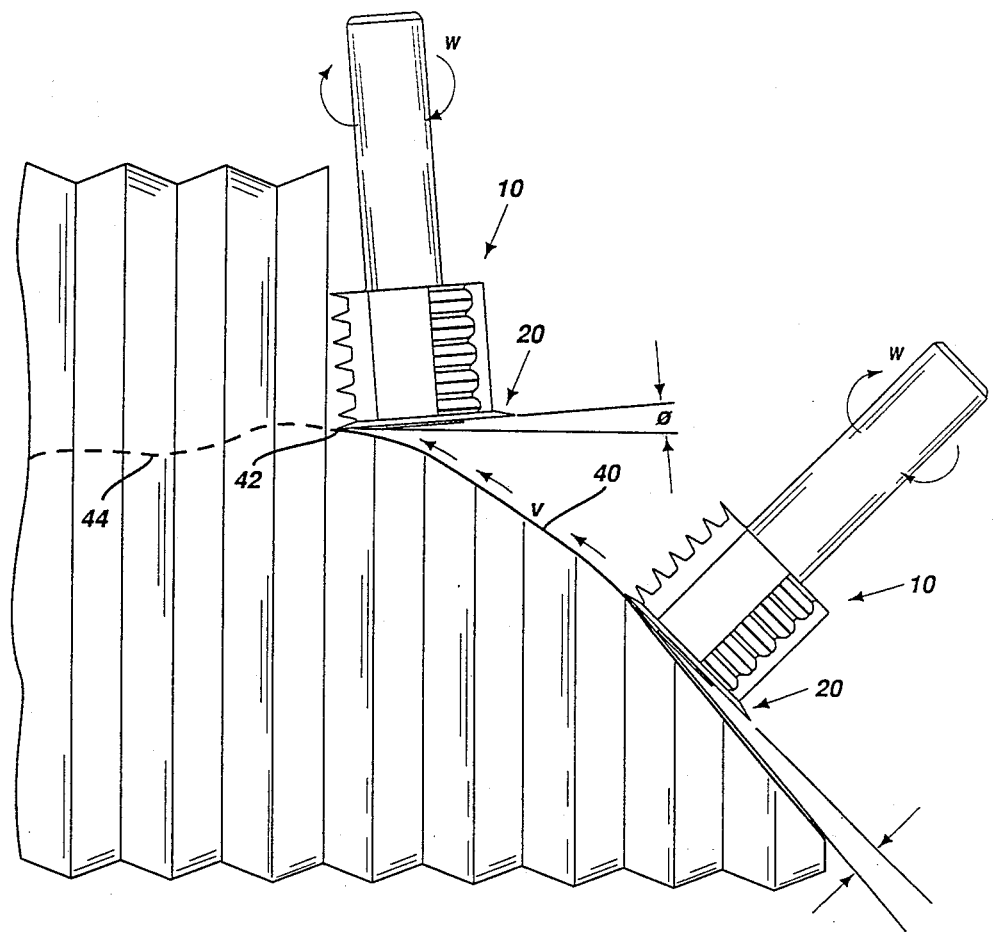
FIG. 6 is a partial cross-sectional view of the milling cutter tool in operation cutting honeycomb core material.

The method of operation is as follows. The shank 12 is clamped into a chuck of a machine tool (not shown), that rotates the milling cutter and drives it in the desired contour, as shown in FIG. 6. The sharp, beveled cutting edge 22 of the circular saw blade 20 cuts the honeycomb core material at the edge to separate the dross from the final top surface. The piercing points 34 act to pierce and slice the honeycomb material located above the circular cutting saw blade 20. The saw blade 20, because of the knife edge and bevel, cuts the honeycomb at a point 42, or over a very small area which may be considered cutting at a point. The lead point 50 of saw blade 20 acts to pierce and slice the honey comb core structure. Simultaneously, the cutter bodies pierce, slice and cut the honeycomb core material directly above the cutting point 42.

The saw blade 20 cuts the honeycomb core material at a lead angle $\phi$ as shown in FIG. 6. The lead angle $\phi$ is that angle formed between a tangent drawn from the point 42 of the cutting action and the leading edge 22 of the saw 20. In a preferred embodiment, the lead angle $\phi$ is between 0.5° and 1.0°, though it may be in the range of 0.5° to 15°. A lead angle φ in excess of 5° has been found to cause excessive heating and rapid dulling of the saw blade 20 of FIG. 1 because of the increased surface area of contact. The saw blade of FIGS. 8-10 is capable of cutting at a greater lead angle, up to 20°, without excessive heating or slowness.

Preferably, the cutting edge 22 contacts the honeycomb core at a point to permit tight curves and exact complex contours to be cut. The surface 40 is a final top surface which has just been cut and the dotted line 44 shows the path through which the milling cutter 10 will be guided to complete the cut. The milling cutter 10 moves forward at a feed rate velocity v and rotates with an angular velocity ω. The feed rate v is in the range of 10 to 100 inches per minute and the angular velocity is in the range of 5,000-20,000 rpm. For a slower angular velocity ω, the feed rate v must also be slower.

The sharp points 34 of the cutter bodies dig into and cut the low-density honeycomb core material better than previous devices or a conventional straight solid flute. The cutting edges 35, extending at a clearance angle with respect to the sharp piercing points 32, slice and cut the honeycomb core dross material above the cutting surface to provide a finely lo sliced swarf and cleanly cut final top surface. The swarf and dross are transported along the cutter bodies, between the teeth 32, by traveling in the space 37. The teeth of a second cutter body 16 are aligned with the space 37 of the previous cutter body 14's teeth 32. The following teeth pierce, cut and slice the dross aligned with the space 37 which were not pierced, cut and sliced by the previous cutter body. The swarf traveling in the surface 37 of the previous cutter body is further sliced and cut by the teeth of the following cutter body. The dross and swarf are thus cleanly cut, sliced and transported while the circular saw blade 20 is performing the cut at edge 38 to create the final, top surface 40.

Figure 8:
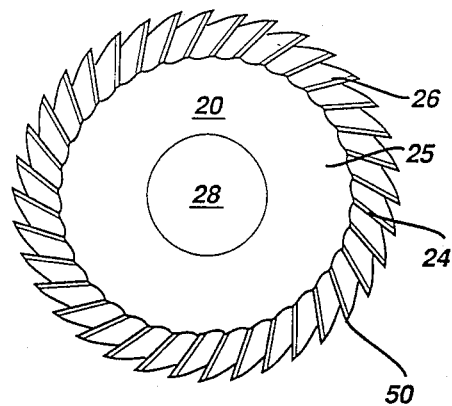
FIG. 8 is a top plan view of an alternative embodiment of the circular saw blade.
Figure 9:
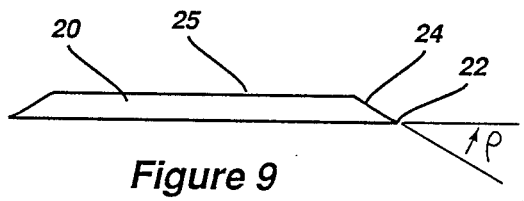
FIG. 9 is a side elevational view of the circular saw blade of FIG. 8.
Figure 10:
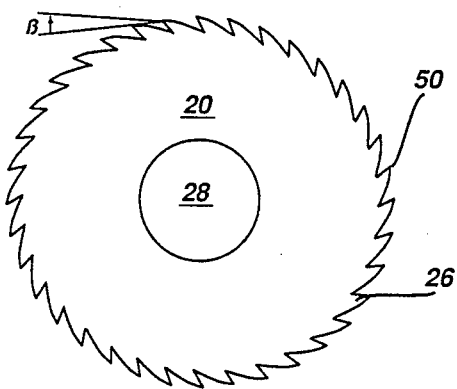
FIG. 10 is a bottom plan view of the circular saw blade of FIG. 8.

An alternative embodiment of the saw blade 20 is illustrated in FIGS. 8-10. The alternative saw blade 20 includes a plurality of sharp teeth 26 around the periphery. The sharp teeth have a leading point 50. The point 50 serves to pierce and cut the honeycomb core. The tooth extends back from the leading point 50 at a clearance angle β, as best shown in FIG. 10. The tooth extends radially inward of the periphery for the radial length of the bevel, shown as 24 in FIGS. 8 and 9. In a further alternative embodiment, the tooth extends longer than the bevel, continuing for some distance along the top, flat portion 25 of the blade 20. The teeth of the saw blade of FIGS. 8-10 are carbide-tipped to extend the cutting life of the blade. Having the teeth extend along the bevel provides the advantage of cutting and slicing of the dross just slightly above the cutting edge, but below the lowest tooth of any cutter body. Having the teeth extend upwards along the bevel also permits a much wider range of leading angles to be used while cutting. A wider range of lead angles permits the cutter 10 to cut much tighter, sharper and more complex contours.

In an alternative embodiment as shown in FIG. 3, the teeth 32 of the cutter bodies are radially inset from the periphery for the length of the bevel 24. Having the teeth 32 aligned with the cutting edge 22 provides the advantage of keeping the saw blade 20 from overheating because less work is performed by the cutting edge 22. Having the teeth 32 slightly recessed, up to the length of the bevel, permits a greater range of lead angles to be used and still provides an operational cutting tool 10 particularly in combination with the saw blade 20 of FIGS. 8-10.

In the preferred embodiment, the cutting edges 35 are generally horizontal, the cutting edge 35 traveling in the track pierced and cut by the point 34. The overlapping teeth of the three cutter bodies ensure that all the dross is pierced, cut and sliced. Though the surface 37 is generally horizontal along the length of the teeth, the dross is cut and the swarf is transported sufficiently to provide a clean-cut, final, top surface with no fuzz or burrs. Alternatively, the cutting edges 32 and space 37 may be placed at a slight angle with respect to the horizontal, or formed as threads to more easily dispose of the dross and move the swarf upwards as the tool 10 rotates. Alternatively, flutes between the cutter bodies 14, 16 and 18 may be threaded upward to transport the dross upward and away from the surface being cut, as illustrated in U.S. Pat. No. 1,328,430, incorporated herein by reference.

We claim:

1. A milling tool for cutting honeycomb core material comprising:
    a shank having a first end for inserting into a chuck;
    a circular saw blade rigidly fixed to said shank at a second end, said saw blade having a top surface, a bottom surface and a cutting edge, said cutting edge being a sharp edge located around a periphery of said saw blade, said top surface being beveled adjacent said saw blade cutting edge, sloping downward toward said periphery to form said sharp cutting edge; and
    a plurality of circumferentially spaced cutter bodies positioned above and adjacent said saw blade top surface, each of said cutter bodies having a plurality of teeth positioned vertically above each other and extending generally horizontal and parallel with respect to each other, each of said teeth having a piercing, cutting point and a sharp cutting edge extending from said piercing cutting point at a clearance angle.

2. The milling tool according to claim 1 wherein said circular saw blade peripheral cutting edge includes a plurality of sharp teeth.

3. A milling tool for cutting honeycomb core material comprising:
    a shank having a first end for inserting into a chuck;
    a circular saw blade rigidly fixed to said shank at a second end, said saw blade having a top surface, a bottom surface and a cutting edge, said cutting edge being a sharp edge located around a periphery of said saw blade, said top surface being beveled adjacent said saw blade cutting edge, sloping downward toward said periphery to form said sharp cutting edge; and
    a plurality of circumferentially spaced cutter bodies positioned above and adjacent said saw blade top surface, each of said cutter bodies having a plurality of teeth extending generally parallel with respect to each other, each of said teeth having a piercing, cutting point and a sharp cutting edge extending from said piercing cutting point at a clearance angle, each of said cutter bodies including a flat surface extending vertically between said teeth of each cutter body.

4. The milling tool according to claim 1 wherein said cutter body piercing points are aligned radially inward from said saw blade cutting edge by the length of said bevel.

5. The milling tool according to claim wherein said bevel is approximately 15°.

6. The milling tool according to claim 2 wherein said saw blade teeth extend radially inward for a length equal to the length of said bevel.

7. The milling tool according to claim 1 wherein said cutter body piercing points are aligned radially approximately at said saw blade cutting edge.

8. The milling tool according to claim 1 wherein said teeth are uniformly spaced with respect to each other on each cutter body, said teeth on each cutter body being vertically offset with respect to the teeth of the other cutting bodies to provide a burrless, cut surface of said honeycomb core material.

9. The milling tool according to claim 6 wherein the piercing point of said teeth of one cutter body are aligned approximately with the base of the teeth of a previous cutter body.

10. The milling tool according to claim 1 wherein said clearance angle is between 5° and 20°.

11. A milling tool for cutting honeycomb core material comprising:
 a shank having a first end for inserting into a chuck;
 a circular saw blade rigidly fixed to said shank at a second end, said saw blade having a top surface, a bottom surface and a cutting edge, said cutting edge being a sharp edge located around a periphery of said saw blade, said top surface being beveled adjacent said saw blade cutting edge, sloping downward toward said periphery to form said sharp cutting edge; and
 a plurality of circumferentially spaced cutter bodied positioned above and adjacent said saw blade top surface, each of said cutter bodies having a plurality of teeth positioned vertically above each other and extending generally horizontal and parallel with respect to each other, each of said teeth having a piercing, cutting point and a sharp cutting edge extending from said piercing cutting point ar a clearance angle cutting point at a clearance angle between 12° and 20°, said cutter body piercing points being aligned radially approximately at said saw blade cutting edge.

12. The method of cutting honeycomb core material comprising:
 cutting said honeycomb core material to create a final top surface free of burrs with a circular saw blade having a beveled, sharp peripheral cutting edge;
 piercing the honeycomb core material for a substantial distance vertically above said final top surface with a plurality of sharp piercing points, said piercing points being located on a plurality of cutter bodies, said cutter bodies being positioned vertically above said saw blade; and
 slicing said honeycomb core material positioned vertically above said final top surface after it has been cut and pierced with a plurality of sharp cutting edges positioned vertically with respect to each other and extending generally horizontal from said piercing point at a clearance angle.

13. The method according to claim 12 wherein said circular saw blade cutting edge is beveled along a top surface of said peripheral cutting edge.

14. The method of cutting honeycomb core material comprising:
 cutting said honeycomb core material to create a final top surface free of burrs with a circular saw blade having a beveled, sharp peripheral cutting edge;
 piercing the honeycomb core material for a substantial distance vertically above said final top surface with a plurality of sharp piercing points, said piercing points being located on a plurality of cutter bodies, said cutter bodies being positioned vertically above said saw blade;
 slicing said honeycomb core material positioned vertically above said final top surface after it has been cut and pierced with a plurality of sharp cutting edges positioned vertically with respect to each other and extending from said piercing point at a clearance angle; and
 slicing said honeycomb core material positioned vertically above said final top surface after it has been cut and pierced with a plurality of sharp cutting edges positioned vertically with respect to each other and extending from said piercing point at a clearance angle; and
 transporting honeycomb core material which has been cut and sliced in a depressed, flat surface extending vertically between and cutter body sharp cutting edges.

15. The method according to claim 12 wherein said clearance angle is between 12° and 20°.

16. The method according to claim 12 wherein said piercing points are aligned radially approximately at said saw blade cutting edge.

* * * * *

UNITED STATES PATENT AND TRADEMARK OFFICE
CERTIFICATE OF CORRECTION

PATENT NO. : 4,907,920

DATED : March 13, 1990

INVENTOR(S) : Wesley C. Lund; Dan E. Pedersen

It is certified that error appears in the above-identified patent and that said Letters Patent is hereby corrected as shown below:

In claim 5, column 7, line 1, following "claim" insert --1--

In claim 10, column 7, line 19, delete "claim 1" and substitute therefor --claim 7--.

In claim 11, column 7, line 32, delete "bodied" and substitute therefor --bodies--, line 39, delete "ar" and substitute therefor --at--.

In claim 14, column 8, delete lines 33-38.

In claim 14, column 8, line 41, delete "and" and substitute therefor --said--.

Signed and Sealed this

Ninth Day of July, 1991

Attest:

HARRY F. MANBECK, JR.

*Attesting Officer*     *Commissioner of Patents and Trademarks*